United States Patent
Patterson (10) Patent No.: US 7,791,213 B2
(45) Date of Patent: Sep. 7, 2010

(54) VERTICAL MOTION WAVE POWER GENERATOR

(76) Inventor: Morris D. Patterson, 1610 Winchester Rd., Huntsville, AL (US) 35811

( * ) Notice: Subject to any disclaimer, the term of this patent is extended or adjusted under 35 U.S.C. 154(b) by 0 days.

(21) Appl. No.: 12/537,735

(22) Filed: Aug. 7, 2009

(65) Prior Publication Data

US 2010/0045044 A1   Feb. 25, 2010

Related U.S. Application Data

(60) Provisional application No. 61/090,295, filed on Aug. 20, 2008.

(51) Int. Cl.
    F03B 13/10    (2006.01)
    F03B 13/12    (2006.01)
    H02P 9/04     (2006.01)
(52) U.S. Cl. .......................... 290/53; 60/504
(58) Field of Classification Search ............... 290/53; 60/504
    See application file for complete search history.

(56) References Cited

U.S. PATENT DOCUMENTS

| | | | | |
|---|---|---|---|---|
| 385,327 | A * | 6/1888 | Starkenberg | 60/503 |
| 639,733 | A * | 12/1899 | Johnson | 60/504 |
| 639,734 | A * | 12/1899 | Johnson | 60/504 |
| 659,609 | A * | 10/1900 | McIntyre | 60/506 |
| 1,083,794 | A * | 1/1914 | Braunsdorf | 60/504 |
| 1,292,303 | A * | 1/1919 | Garwood | 60/504 |
| 1,385,083 | A * | 7/1921 | Mcculley | 60/505 |
| 1,393,472 | A * | 10/1921 | Williams | 290/42 |
| 2,783,022 | A * | 2/1957 | Salzer | 60/505 |
| 3,567,953 | A * | 3/1971 | Lord | 290/42 |
| 3,668,412 | A * | 6/1972 | Vrana et al. | 290/53 |
| 3,706,507 | A * | 12/1972 | Dunbar | 415/7 |
| 3,911,287 | A * | 10/1975 | Neville | 290/53 |
| 3,959,663 | A * | 5/1976 | Rusby | 290/53 |
| 3,965,365 | A * | 6/1976 | Parr | 290/53 |
| 3,994,629 | A | 11/1976 | Tah-sun | 417/329 |
| 4,023,041 | A | 5/1977 | Chappell | 290/53 |
| 4,145,885 | A | 3/1979 | Solell | 60/504 |
| 4,184,335 | A * | 1/1980 | Byrne | 60/496 |
| 4,228,360 | A * | 10/1980 | Navarro | 290/43 |
| 4,241,579 | A * | 12/1980 | Borgren | 60/504 |
| 4,249,085 | A * | 2/1981 | Kertzman | 290/53 |
| 4,261,562 | A * | 4/1981 | Flavell | 482/6 |
| 4,285,196 | A * | 8/1981 | Ekstrom et al. | 60/499 |
| 4,301,377 | A | 11/1981 | Rydz | 290/43 |
| 4,305,003 | A * | 12/1981 | Basurto et al. | 290/54 |
| 4,319,454 | A * | 3/1982 | Lucia | 60/506 |
| 4,379,235 | A * | 4/1983 | Trepl, II | 290/53 |
| 4,389,843 | A * | 6/1983 | Lamberti | 60/507 |
| 4,392,060 | A * | 7/1983 | Ivy | 290/53 |

(Continued)

Primary Examiner—T C Patel
Assistant Examiner—Pedro J Cuevas
(74) Attorney, Agent, or Firm—Gerald M. Walsh; Kenneth M. Bush; Bush Intellectual Property Law (57) ABSTRACT

A vertical motion wave power generator having a flotation device, a vertical support structure fixed to the ocean bottom, and a single power shaft attached rotatably to the flotation device. By the use of a pair of one-way clutches the single power shaft converts the up and down motion of ocean waves into continuous unidirectional rotational force to drive an electric generator. The power shaft, transmission, and generator are all attached to the flotation device and move up and down in unison with the flotation device.

9 Claims, 6 Drawing Sheets

U.S. PATENT DOCUMENTS

| | | | | |
|---|---|---|---|---|
| 4,467,218 | A | 8/1984 | Andruszkiw et al. | 290/54 |
| 4,539,484 | A | 9/1985 | Suggs | 290/53 |
| 4,598,547 | A * | 7/1986 | Danihel | 60/507 |
| 4,599,858 | A * | 7/1986 | La Stella et al. | 60/497 |
| 4,610,140 | A * | 9/1986 | Thompson, Jr. | 60/506 |
| 4,612,768 | A * | 9/1986 | Thompson, Jr. | 60/506 |
| 4,627,240 | A * | 12/1986 | Holmes | 60/507 |
| 4,636,141 | A | 1/1987 | Sedlacek | 416/86 |
| 4,672,222 | A * | 6/1987 | Ames | 290/53 |
| 4,718,231 | A * | 1/1988 | Vides | 60/398 |
| 5,066,867 | A * | 11/1991 | Shim | 290/53 |
| 5,105,094 | A | 4/1992 | Parker | 290/53 |
| 5,244,359 | A * | 9/1993 | Slonim | 417/332 |
| 5,359,229 | A * | 10/1994 | Youngblood | 290/53 |
| 5,424,582 | A * | 6/1995 | Trepl et al. | 290/53 |
| 5,860,321 | A * | 1/1999 | Williams et al. | 74/143 |
| 5,889,336 | A * | 3/1999 | Tateishi | 290/53 |
| 5,929,531 | A * | 7/1999 | Lagno | 290/53 |
| 6,133,644 | A | 10/2000 | Smith et al. | 290/53 |
| 6,247,308 | B1 * | 6/2001 | Solell | 60/495 |
| 6,476,512 | B1 | 11/2002 | Rutta | 290/42 |
| 6,681,572 | B2 * | 1/2004 | Flory | 60/507 |
| 6,711,897 | B2 * | 3/2004 | Lee | 60/507 |
| 6,925,800 | B2 * | 8/2005 | Hansen et al. | 60/497 |
| 6,933,624 | B2 * | 8/2005 | Beaston | 290/43 |
| 7,076,949 | B2 | 7/2006 | Fernandez Gomez et al. | 60/498 |
| 7,315,092 | B2 * | 1/2008 | Cook | 290/53 |
| 7,352,073 | B2 * | 4/2008 | Ames | 290/42 |
| 7,383,781 | B1 * | 6/2008 | Griffin | 114/44 |
| 7,456,512 | B2 * | 11/2008 | Nadel | 290/53 |
| 7,683,500 | B2 * | 3/2010 | Greenspan et al. | 290/53 |
| 7,687,931 | B2 * | 3/2010 | Gasendo | 290/54 |
| 7,735,319 | B2 * | 6/2010 | Vukovic | 60/500 |
| 2003/0129893 | A1 * | 7/2003 | Gorshkov | 440/99 |
| 2006/0028026 | A1 | 2/2006 | Yim | 290/53 |
| 2006/0208494 | A1 * | 9/2006 | Cook | 290/53 |
| 2006/0232074 | A1 | 10/2006 | Chiasson | 290/53 |
| 2008/0084069 | A1 | 4/2008 | Lee | 290/53 |
| 2008/0217921 | A1 * | 9/2008 | Raftery | 290/53 |
| 2008/0272600 | A1 * | 11/2008 | Olson | 290/53 |
| 2009/0211240 | A1 * | 8/2009 | Patton | 60/498 |
| 2009/0322092 | A1 * | 12/2009 | Werjefelt | 290/53 |
| 2010/0043425 | A1 * | 2/2010 | Dragic | 60/504 |
| 2010/0047071 | A1 * | 2/2010 | Patterson | 416/169 R |
| 2010/0064679 | A1 * | 3/2010 | Straume | 60/507 |
| 2010/0102563 | A1 * | 4/2010 | Akervoll | 290/53 |
| 2010/0133842 | A1 * | 6/2010 | Lin | 290/53 |

* cited by examiner

VERTICAL MOTION WAVE POWER GENERATOR

CROSS-REFERENCE TO RELATED APPLICATION

This application claims the benefit of U.S. Provisional Application No. 61/090,295 filed Aug. 20, 2008, the disclosure of which is incorporated herein in its entirety as if fully set forth below.

BACKGROUND OF THE INVENTION

1. Field of the Invention

This invention relates generally to devices for generating power from vertical motion and, more particularly, to an apparatus for generating power from the vertical motion of ocean waves.

2. Technical Background

Vertical motion wave power generators for producing electricity from ocean waves are known. It has been effective to use one-way clutches to convert the up and down vertical motion of waves into unidirectional rotary motion to turn an electric generator. However, existing devices have been too complex, or insufficiently durable, or too small to be practical or of commercial value.

U.S. Pat. No. 5,105,094 discloses a stationary wave generator that operates by moving a piston up and down in a cylinder. The piston engages a drive through a rack and pinion gear system which then engages a unidirectional rotary power shaft. The rotary power shaft and generator are fixed and do not float up and down. The rack and pinion arrangement is subject to excessive wear. The piston and cylinder need constant maintenance and there needs to be a draining regulation mechanism. The device is useful only for shore waves and a large number of units would be required to produce sufficient power.

U.S. Patent Application No. 2006/0232074 discloses a stationary wave generator that uses a float and lever with a linkage system to drive a drive shaft clockwise and counterclockwise. The drive shaft engages a power shaft so as to rotate it in one direction. The float and lever system, with the linkage to a stationary generator, is susceptible to damage due to the force of waves. The flotation capacity of the float in this system is small and many units would be required to produce sufficient power.

U.S. Pat. No. 6,476,512 describes a stationary wave generator that moves a float up and down in a tall tower. Five different rotating shafts in this system are required to convert the up and down vertical motion of the float into unidirectional rotational motion. The float is relatively small so that many units would be required to produce sufficient power.

U.S. Patent Application No. 2006/0028026 discloses a stationary wave generator that captures only the upward force of a wave using a plurality of worm gears and rack and pinion gears. The system has low total buoyancy.

U.S. Pat. No. 7,315,092 discloses a floating wave generator in which the generator portion is connected by arms to two floats which move up and down in a direction opposite to that of the generator portion. One of the floats turns a drive shaft clockwise and counterclockwise. The drive shaft engages a power shaft so as to rotate it in one direction. The constant opposing motion between the floats and the generator create problems of wear and insufficient durability. There is no capacity for a flywheel in this system which is usually required with the use of one-way clutches. The system is inherently limited in size and many units would be required to produce sufficient power.

U.S. Pat. No. 4,539,484 discloses a floating wave generator system in which the generator system is attached to a float which moves up and down with the motion of waves. The float is confined within a frame which is connected to the ocean bottom. Cables are connected to the frame below and above the float. The central portions of the cables are wound several times around drums to rotate the drums clockwise and counterclockwise as the float moves up and down with the motion of the waves. One-way clutches are attached to each end of the drums. A plurality of reversing gears and worm gears are used to convert the clockwise and counterclockwise rotation of the drums into unidirectional rotation. A third over-running clutch is required to transfer the unidirectional rotation to an electric generator. The cable that is wound around the drum is subject to considerable friction which causes undue wear on the cable and the drum. The plurality of reversing gears and worm gears also causes undue friction, wear, and maintenance. The float is relatively difficult to disengage from the frame when it is necessary to remove the float to a harbor, such as during a storm or for repair.

What is needed, but which has never been available, is a system in which the generator is attached to a float and moves up and down with the float to prevent wear, tear, and damage; up and down motion is converted to unidirectional rotary motion with a single power shaft without the need for a plurality of intervening power shafts and gears so that the system is durable and requires little maintenance and repair; the power generating capacity of the system can be equal to that of a nuclear power plant; and the flotation system is easy to disengage from a support frame structure for transport.

SUMMARY OF THE INVENTION

The present invention is a vertical motion power generator system for converting vertical up and down motion to unidirectional rotational force for generating power. The system has a platform, such as a flotation device, associated with a vertical support structure fixed to the ground, including the bottom of a body of water, such as an ocean. A single power shaft is attached rotatably to the platform. First and second one-way clutches are fixed to the power shaft, with each of the one-way clutches having an outer casing. A sprocket or pulley is fixed to each outer casing, and the sprocket or pulley is also attached rotatably to the power shaft. A first chain, belt, or cable has a first end attached to the ground or to the vertical support structure at a position below the platform and the power shaft. The first chain has a second opposite end extending upward over the sprocket or pulley on the first one-way clutch and extends downward therefrom. A second chain, belt, or cable has a first end attached to the vertical support structure at a position above the platform and power shaft, and has a second opposite end extending downward under the sprocket or pulley on the second one-way clutch. The second opposite end extends upward therefrom and over an idler pulley attached to the vertical support structure at a position above the platform and power shaft, and extends downward therefrom.

The first clutch engages the power shaft as the platform is raised upward, thereby rotating the power shaft in a fixed direction while the second clutch is disengaged from said power shaft. The second clutch engages the power shaft as the platform is lowered downward, thereby rotating the power shaft in the fixed direction while the first clutch is disengaged from said power shaft. The power shaft thus rotates continuously in the fixed direction as the platform moves up and down, thereby providing continuous unidirectional rotational force to drive a generator.

An advantage of the present invention is a wave motion power generator in which the power shaft, transmission, and generator are all together on a flotation device, and they all move up and down in unison with the flotation device.

Another advantage is a wave motion power generator that uses a simple vertical frame structure attached to the ocean bottom and only a single drive chain needs to be attached to the ocean bottom.

Another advantage is a wave motion power generator that uses a single, simple power shaft to convert the up and down vertical motion of ocean waves into continuous unidirectional rotation.

Another advantage is a wave motion power generator that can be scaled up to produce power output similar to a nuclear reactor.

Another advantage is a wave motion power generator that is easy to disengage from the vertical support structure for transportation.

DETAILED DESCRIPTION

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

A preferred embodiment of the present invention is a floating electric wave generator system or apparatus which is attached to a flotation device. The system has a power shaft with first and second one-way clutches arranged so that both clutches rotate the power shaft in a first direction when they are rotated in this first direction, but are disengaged when rotated in a second opposite direction. The first clutch is attached to a sprocket which is driven by a chain attached to the floor of the ocean. The second clutch is attached to an overhead horizontal support which is attached to vertical supports attached to the ocean floor. As the flotation device moves up towards the top of a wave, the first clutch turns in the first direction which turns the power shaft in the first direction. The second clutch is turned in the opposite second direction and is disengaged. As the flotation device moves downwards to the bottom of a wave, the first clutch turns in the opposite second direction and is disengaged. The second clutch is turned in the first direction which turns the power shaft in the first direction. Thus, the up and down vertical motion of the waves are converted into unidirectional rotation of the power shaft. The power shaft can be connected to an electric generator through a transmission to rotate the electric generator in one direction, thereby producing electric current.

Figure 1:
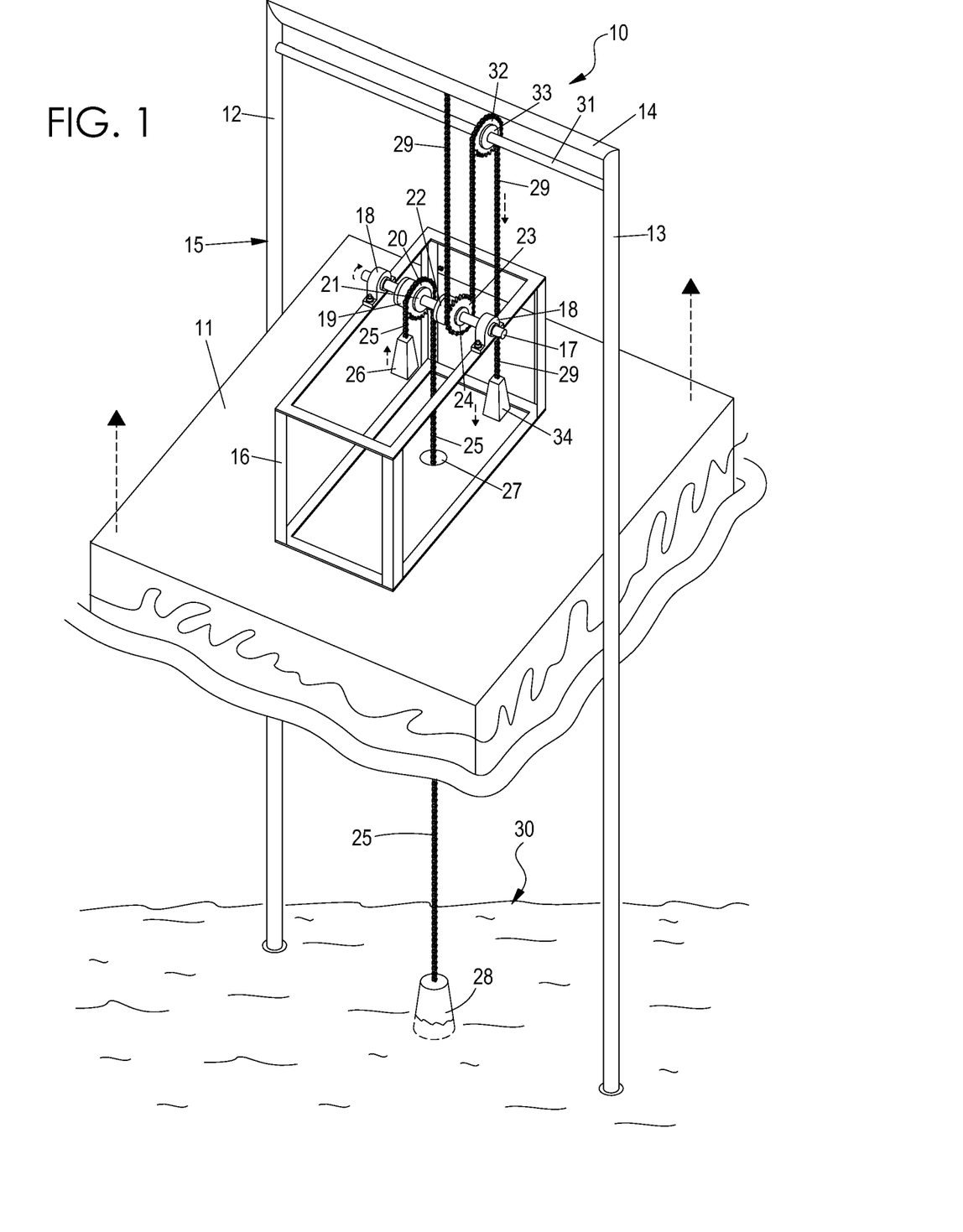
FIG. 1 illustrates the floating vertical wave power generating system of the present invention as it floats upwards to the top of an ocean wave.

FIG. 1 illustrates a floating vertical wave generator system 10 as it is floating upwards to the top of an ocean wave. A support frame 16 is attached to a platform, such as a flotation device 11. A power shaft 17 is attached rotatably to the flotation device 11 by means of support frame 16 and bearings 18. One-way clutches 19, 22 are attached to the power shaft 17 in such a way that they engage when rotated clockwise and disengage when rotated counterclockwise. They can also be attached to engage when rotated counterclockwise and disengage when rotated clockwise if desired. A sprocket 20 is attached to clutch 19. Sprocket 20 is also attached to a bearing 21, and bearing 21 is attached to power shaft 17. Bearing 21 supports sprocket 20 on power shaft 17 and allows sprocket 20 to rotate on power shaft 17. Likewise, attached to clutch 22 is a sprocket 23 attached to bearing 24 which is attached to power shaft 17. Bearing 24 supports sprocket 23 on power shaft 17 allowing sprocket 23 to rotate on power shaft 17. In this manner the sprockets 20 and 23 are attached rotatably to power shaft 17 while being attached fixedly to clutches 19 and 22.

Figure 2:
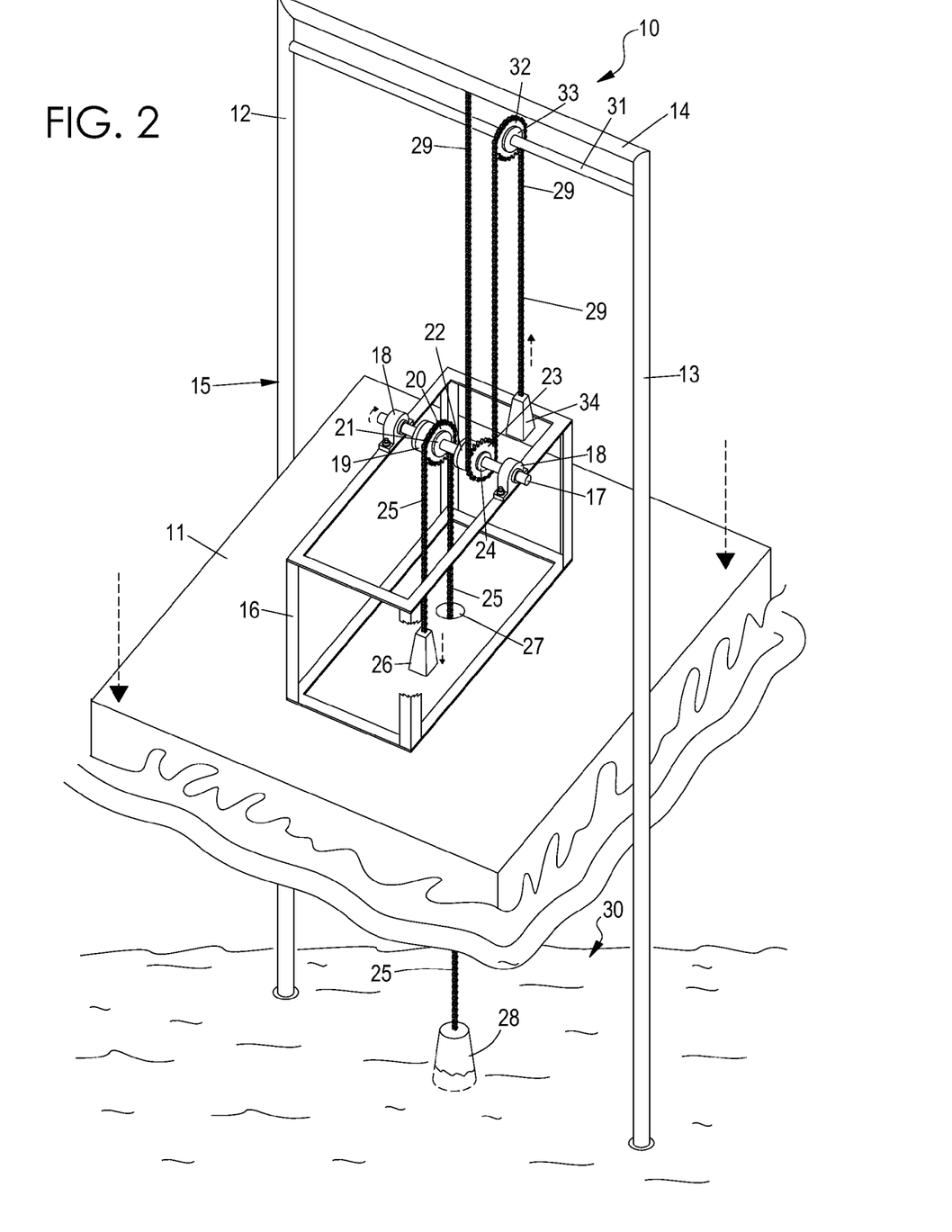
FIG. 2 illustrates the floating vertical wave power generating system as it floats downwards to the trough of an ocean wave.

Support frame 16 is positioned within a vertical support structure 15 having a first vertical support 12, a second vertical support 13, and a horizontal support 14 attached in between the top ends of vertical supports 12 and 13. The vertical supports 12, 13 are attached to the ocean floor 30. A first chain 25 is attached at one end to the ocean floor 30 by anchor 28 or can be attached to the vertical support structure 15 below the flotation device 11. The opposite end of first chain 25 extends up through flotation device 11 through opening 27. First chain 25 is positioned over sprocket 20 and extends downward therefrom, and the opposite end has a first weight 26 having just sufficient weight to keep chain 25 taut. Just beneath horizontal support 14 is a horizontal shaft 31 attached in between vertical supports 12, 13. An idler sprocket 32 is attached to horizontal shaft 31 by means of a bearing 33 which allows sprocket 32 to rotate freely around horizontal shaft 31. As shown in FIGS. 1 and 2, horizontal support 14, horizontal shaft 31, and idler sprocket 32 are positioned above flotation device 11 and power shaft 17. A second chain 29 is attached at one end to horizontal support 14 above the power shaft 17. The opposite end of second chain 29 extends down and is positioned under sprocket 23, and extends upward over idler sprocket 32 and downwards therefrom. The opposite end of second chain 29 has a second weight 34 with just sufficient weight to keep second chain 29 taut. Sprocket 20 rotates clockwise and sprocket 23 rotates counterclockwise as flotation device 11 moves upward (see FIG. 3).

Figure 3:
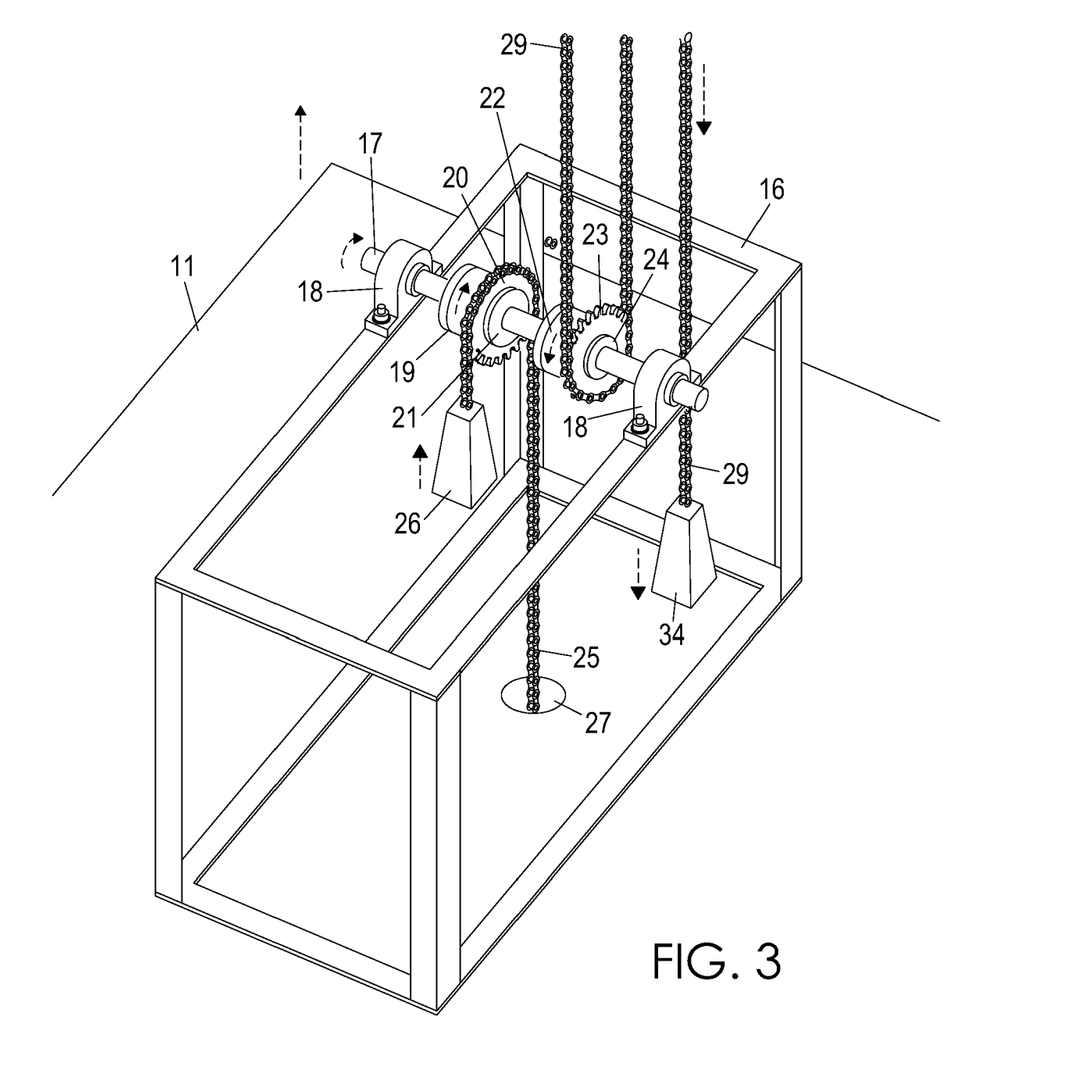
FIG. 3 illustrates the elements of the power shaft as shown in FIG. 1 in more detail.
Figure 4:
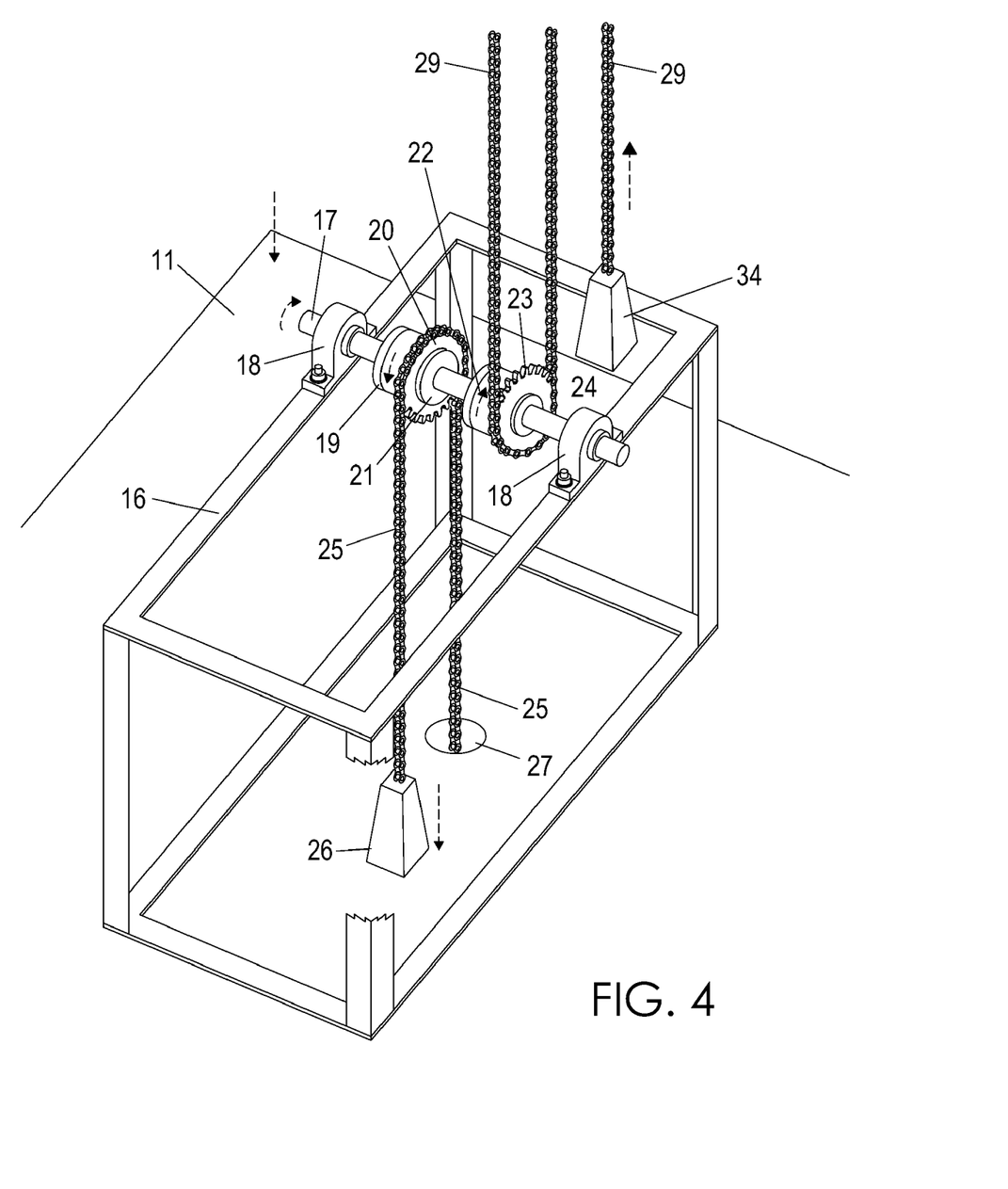
FIG. 4 illustrates the elements of the power shaft as shown FIG. 2 in more detail.

FIG. 1 shows that as flotation device 11 moves upward towards the top of a wave, first chain 25 pulls on sprocket 20 causing it to rotate clockwise and weight 26 moves upward. This causes clutch 19 to rotate clockwise so that it engages power shaft 17, causing power shaft 17 to rotate clockwise. Second chain 29 pulls on sprocket 23 causing it to rotate counterclockwise, and weight 34 moves downward. Clutch 22 is, thus, disengaged and exerts no rotational force on power shaft 17. FIG. 2 illustrates the floating wave generator system 10 as it is floating downwards to the bottom or trough of a wave. As the float 11 moves downward sprocket 20 rotates counterclockwise and sprocket 23 rotates clockwise. The first chain 25 pulls on sprocket 20 causing it to rotate counterclockwise and weight 26 moves downward. This causes clutch 19 to rotate counterclockwise so that it is disengaged and, thus, exerts no rotational force on power shaft 17. Second chain 29 pulls on sprocket 23 causing it to rotate clockwise and weight 34 moves upward. This causes clutch 22 to rotate clockwise so that it engages power shaft 17, causing power shaft 17 to rotate clockwise. FIGS. 3 and 4 illustrate the elements of power shaft 17 in more detail.

Figure 5:
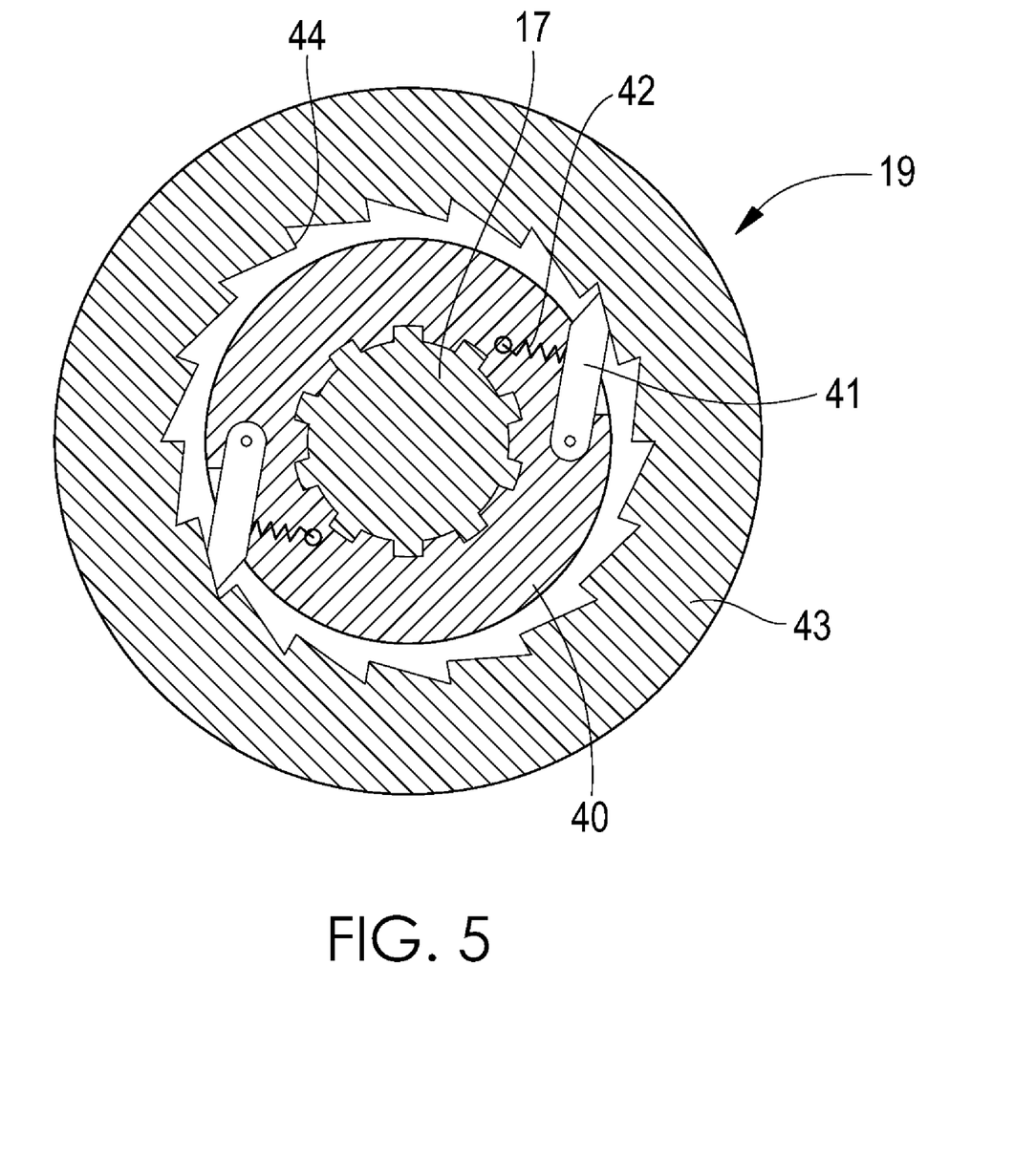
FIG. 5 shows a cross-sectional view of one type of one-way clutch that can be used on the power shaft.

FIG. 5 shows a cross-sectional view of one type of one-way clutch that could be used as clutch 19 or 22. The clutch in this example has a pawl-wheel 40 which is fixed to power shaft 17. Ratchet pawls 41 are attached rotatably to pawl-wheel 40 and are biased away from pawl-wheel 40 by springs 42. Surrounding pawl-wheel 40 is an outer casing 43 having saw-tooth elements 44 on its inner circumference. The sprockets 20 or 23 can be fixed to outer casing 43. As the sprocket rotates clockwise the outer casing 43 rotates clockwise. As the outer casing 43 rotates clockwise the saw-teeth 44 engage the ratchet-pawls 41, causing the power shaft 17 to rotate clockwise. As the sprocket rotates counterclockwise the outer casing 43 rotates counterclockwise. As the outer casing 43 rotates counterclockwise the saw-teeth 44 slip freely over the ratchet-pawls 41, causing the clutch to be disengaged and no rotational force is applied to power shaft 17. The one-way clutch can be configured to operate in a reverse manner.

Figure 6:
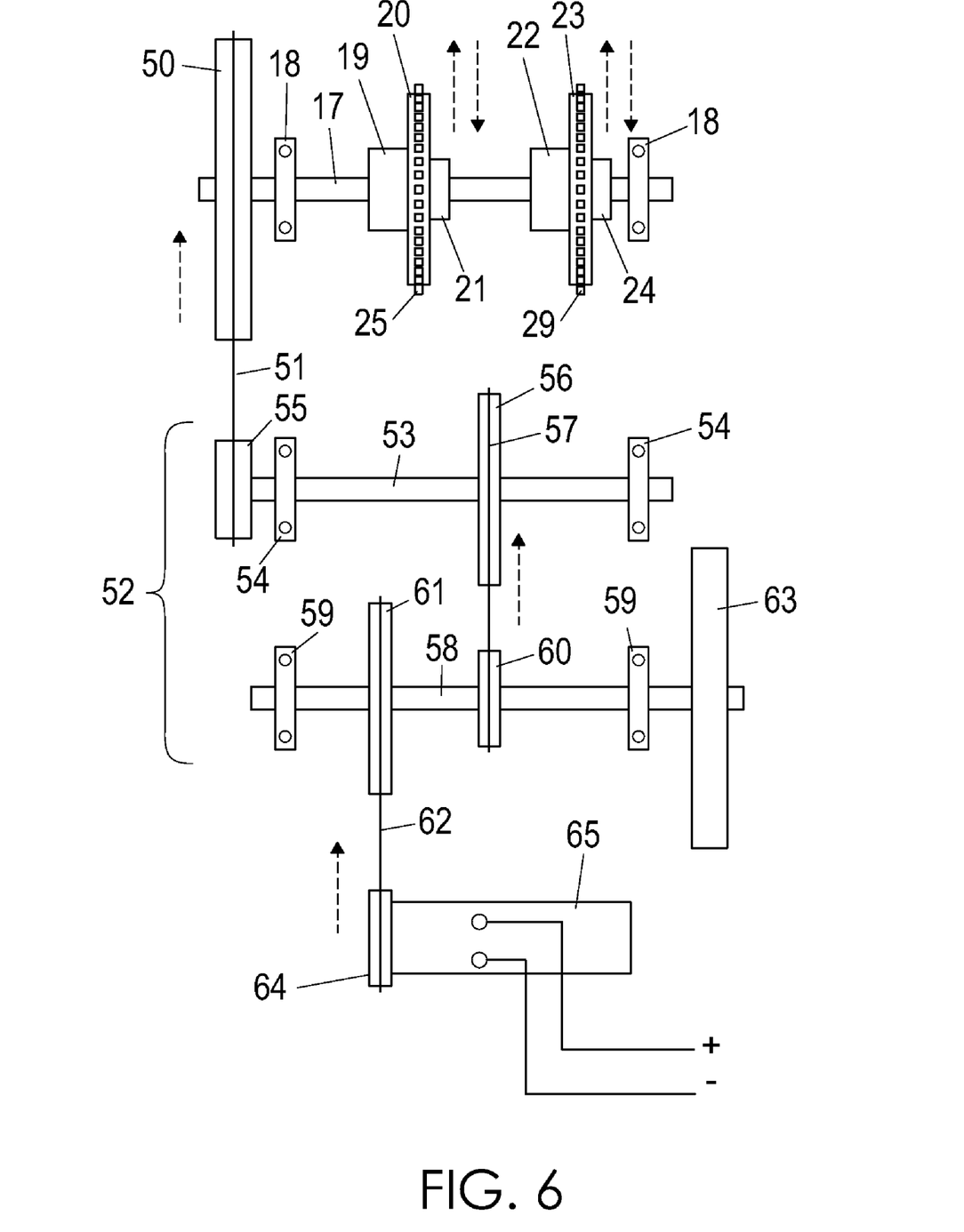
FIG. 6 shows an example of a transmission that can be used to increase the speed of rotation from the power shaft to an electric generator.

FIG. 6 shows an example of how power shaft 17 can be connected to an electric generator 65 by means of a transmission 52 to increase the speed of rotation from the power shaft 17 to the electric generator 65. Power shaft 17 can have a large power pulley 50 which transmits the unidirectional rotational force of power shaft 17 to a smaller first pulley 55 on a first shaft 53 of transmission 52 by means of belt 51. First shaft 53 is held in place on support frame 16 by bearings 54 (see FIGS. 3 and 4). First shaft 53 has a large pulley 56 which transmits the unidirectional rotational force to a smaller second pulley 60 on a second shaft 58 of transmission 52 by means of belt 57. Second shaft 58 is held in place on support frame 16 by bearings 59 (see FIGS. 3 and 4). Second shaft can have a flywheel 63 to maintain a constant rotation of shaft 58. Shaft 58 also has a large pulley 61 which transmits the unidirectional rotational force to a smaller pulley 64 on an electric generator 65 by means of belt 62. Thus, as power shaft 17 is made to rotate clockwise at about 5 to 10 times per minute, depending upon the frequency of waves moving flotation device 11 up and down, transmission 52 can make electric generator 65 turn at speeds as high as 2000 rpm.

The foregoing description has been limited to specific embodiments of this invention. It will be apparent; however, that variations and modifications may be made by those skilled in the art to the disclosed embodiments of the invention, with the attainment of some of all of its advantages and without departing from the spirit and scope of the present invention. For example, the floating vertical motion wave power generator 10 (FIGS. 1 and 2) of the present invention can be scaled up to any desirable size, and the flotation device can be of any desired buoyancy capacity. The vertical motion floating wave generator 10 can be attached to a large ship, such as a 60 million gallon oil tanker. This is equivalent to 516 million pounds of buoyancy which converts to about the same electric energy output as a nuclear reactor, assuming 7 foot waves at a frequency of 7 waves per minute. The flotation device can be tethered to the horizontal and vertical supports to prevent it from drifting. Other types of one-way clutches can be used, such as Sprague clutches and Reynolds clutches. Cables or belts may be used in place of a chain, and pulleys may be used in place of sprockets. The vertical motion wave power generator can be adapted to interface with any type of up and down vertical motion to generate electricity. For example, as trains move across railroad tracks, the tracks are pushed down and then spring back up as the train passes. This motion of the railroad tracks can be converted to electricity by means of the present invention using a lever having one end attached under the track. As the trains move across the railroad tracks the lever would be pushed up and down. The opposite end of the lever can have a platform to attach the power shaft, transmission, and generator, and the vertical support frame and drive chain can be attached to the ground, as described above, providing the system for generating power from the up and down vertical motion of the tracks. The vertical motion wave power generator can generate pressure power in addition to electric power. The power shaft 17, attached rotatably to support frame 16 (see FIGS. 1-4), can extend over an end or side of the flotation device 11, with the second opposite end of first chain 25 extending upward over said sprocket or pulley 20 without passing through an opening 27 in the flotation device 11.

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. An apparatus for converting vertical up and down motion to unidirectional rotational force for generating power, comprising:
   a) a platform;
   b) a vertical support structure fixed to the ground;
   c) a single power shaft attached rotatably to said platform;
   d) first and second one-way clutches both fixed directly to said single power shaft, said one-way clutches each having an outer casing;
   e) a sprocket or pulley fixed to each outer casing, and said sprocket or pulley attached rotatably to said single power shaft;
   f) a first chain, belt, or cable having a first end attached directly to the ground or to said vertical support structure at a position below said platform and said single power shaft, and having a second opposite end extending upward over said sprocket or pulley on said first one-way clutch and extending downward therefrom;
   g) a second chain, belt, or cable having a first end attached directly to said vertical support structure at a position above said platform and said single power shaft, and having a second opposite end extending downward under said sprocket or pulley on said second one-way clutch and extending upward therefrom and over an idler pulley attached to said vertical support structure at a position above said platform and said single power shaft, and extending downward therefrom, wherein said first chain, belt, or cable drives said first one-way clutch to rotate said single power shaft, and said second chain, belt, or cable drives said second one-way clutch to rotate the same said single shaft;
   h) said first clutch engaging said single power shaft by means of said first chain, belt, or cable as said platform is raised upward, thereby rotating said single power shaft in a fixed direction while said second clutch is disengaged from said single power shaft;
   i) said second clutch engaging said single power shaft by means of said second chain, belt, or cable as said platform is lowered downward, thereby rotating said single power shaft in said fixed direction while said first clutch is disengaged from said single power shaft; and
   j) said single power shaft rotating in said fixed direction by the action of said first and second one-way clutches attached thereto as said platform moves up and down, thereby providing unidirectional rotational force in said single power shaft to drive a generator.

2. The apparatus of claim 1 wherein said single power shaft is positioned over said platform and said second opposite end of said first chain, belt, or cable passes through an opening in said platform, and has a weight to keep said first chain, belt, or cable taut.

3. The apparatus of claim 2 further comprising a transmission with a flywheel positioned between said single power shaft and said generator to increase the speed of rotation from said single power shaft to said generator, wherein said flywheel is not positioned on said single power shaft.

4. The apparatus of claim 3 wherein said platform is a flotation device for use on a body of water to convert the up and down motion of waves in the body of water into unidirectional rotational force of said single power shaft to which said first and second clutches are attached thereto.

5. The apparatus of claim 4 wherein said single power shaft, transmission, and generator are all attached to said flotation device and move up and down in unison with said flotation device, and wherein said second opposite end of said second chain, belt, or cable has a weight to keep said first chain, belt, or cable taut.

6. The apparatus of claim 1 wherein said single power shaft extends over an end or side of said platform with said second opposite end of said first chain extending upward over said sprocket or pulley without passing through said platform, and wherein said second opposite end of said first chain, belt, or cable has a weight to keep said first chain, belt, or cable taut.

7. The apparatus of claim 6 further comprising a transmission with a flywheel positioned between said single power shaft and said generator to increase the speed of rotation from said single power shaft to said generator, wherein said flywheel is not positioned on said single power shaft.

8. The apparatus of claim 7 wherein said platform is a flotation device for use on a body of water to convert the up and down motion of waves in the body of water into unidirectional rotational force of said single power shaft to which said first and second clutches are attached thereto.

9. The apparatus of claim 8 wherein said single power shaft, transmission, and generator are all attached to said flotation device and move up and down in unison with said flotation device, and wherein said second opposite end of said second chain, belt, or cable has a weight to keep said first chain, belt, or cable taut.

* * * * *